United States Patent [19]
Fujita

[11] Patent Number: 4,650,330
[45] Date of Patent: Mar. 17, 1987

[54] SURFACE CONDITION MEASUREMENT APPARATUS

[75] Inventor: Hiroo Fujita, Tanashi, Japan

[73] Assignee: Citizen Watch Co., Ltd., Tokyo, Japan

[21] Appl. No.: 608,744

[22] Filed: May 10, 1984

[30] Foreign Application Priority Data

| May 13, 1983 | [JP] | Japan | 58-83756 |
| May 17, 1983 | [JP] | Japan | 58-86378 |
| Nov. 4, 1983 | [JP] | Japan | 58-207277 |
| Nov. 4, 1983 | [JP] | Japan | 58-207275 |

[51] Int. Cl.$^4$ .............................................. G01B 9/02
[52] U.S. Cl. ..................................... 356/349; 356/359
[58] Field of Search ......................... 356/349, 359, 360

[56] References Cited

U.S. PATENT DOCUMENTS 3,523,735 8/1970 Taylor ............................. 356/349

OTHER PUBLICATIONS

Baronian "Acoustooptic Bragg Diffraction Devices and their Applications", *IEEE* 74 *Region Conference*, pp. 70–77, 1974.

Sommarghen, "Optical Heteroclyne Profilometry", *Applied Optics* vol. 20, No. 4, pp. 610–618, Feb. 1981.

*Primary Examiner*—Vincent P. McGraw
*Assistant Examiner*—Matthew W. Koren
*Attorney, Agent, or Firm*—Jordan and Hamburg

[57] ABSTRACT

A surface condition measurement apparatus comprises a laser light source producing a light beam which is converted into two light beams of mutually different frequencies by an acousto-optical element, these light beams are split into two pairs directed in different directions with one pair serving to generate a beat-frequency signal used as a phase reference signal by heterodyne interference and the other pair being focussed onto a body surface to be reflected therefrom and with an electrical signal being generated from the reflected light as a beat-frequency signal, a phase difference between the latter signal and the reference signal being measured and processed to derive a difference in surface height between the surface points from which the light beam pair are reflected.

14 Claims, 23 Drawing Figures

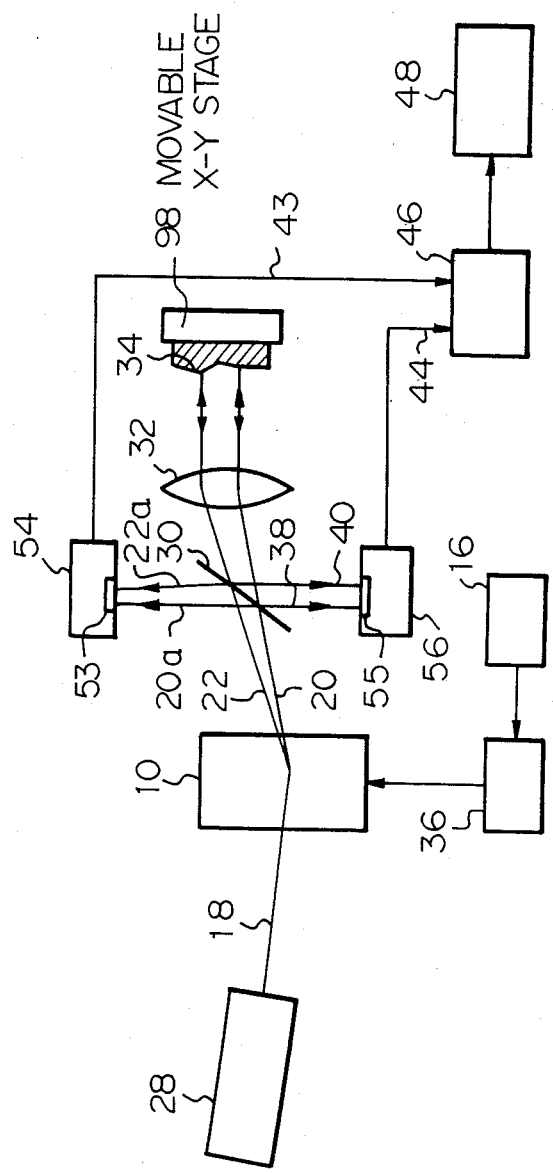

SURFACE CONDITION MEASUREMENT APPARATUS

The present invention relates to a non-contact type of surface condition measurement apparatus which can detect and measure very minute variations in height of a surface to a higher degree of accuracy than has been possible in the prior art by utilizing the heterodyne interference of light to convert a phase shift between two light beams, representing a surface height difference, into an identical phase shift of an electrical signal.

Various methods have been proposed in the prior art for measurement of the conditions of a surface to a very high degree of precision, e.g. surface roughness, minute variations in surface height, minute changes in slope, etc.

The apparatus used in the prior art is mainly based on the homodyne interference, principle, which utilizes a pair of light beams having identical frequency. Such a type of apparatus is capable of measurement of surface variations down to level of the order of 0.1 $\mu$m. However, there is an increasing demand for apparatus capable of measurement of surface height variations to a considerably higher degree of precision, e.g. such as to provide measurement accuracy of the order of 0.01 $\mu$m or better. It has been proposed in the prior art to utilize the heterodyne interference of light effect to provide such an improved degree of measurement accuracy, however a practical form of such an apparatus has not yet been disclosed. One example of a prior art proposal for such an apparatus, described in detail hereinafter, is based upon the generation of a pair of light beams which mutually differ slightly in frequency, by an accusto-optic light deflector which is driven by a drive signal generated by a double-balanced modulator, i.e. which includes upper and lower sideband components. These light beams are directed onto the surface under measurement such as to impinge thereon at two points spaced very slightly apart. The resultant reference light beams are caused to mutually interfere and fall upon a photo-receptor to be converted to a beat-frequency signal which includes a frequency component equal to a multiple of the frequency difference between the two light beams directed on the surface under measurement. This beat-frequency signal component will be shifted in phase in proportion to any difference between the surface heights of the points on which the light beams are incident, due to a resultant difference in overall path length between the light beams. This phase shift is measured by filtering out the required frequency component and comparing this with a signal derived from a modulation signal applied to the acousto-optic light deflector driver circuit, using a phase comparator.

However, it has not proven practical to put such an arrangement to practical use, due to certain basic disadvantages. Some of these result from the fact that a very long overall optical path is necessary, since light reflected from the surface under measurement is passed back through the acousto-optic light deflector before being converted to an electrical signal. Due to this long optical path length, the system is very sensitive to disturbances such as mechanical vibration.

SUMMARY OF THE INVENTION

It is an objective of the present invention to provide a surface condition measurement apparatus utilizing the heterodyne interference of light principle, for measuring height and slope variations of a surface to a very high degree of accuracy, with the apparatus being readily calibrated and utilized on a practical basis.

A surface condition measurement apparatus according to the present invention basically comprises a laser light source producing a light beam which is arranged to be incident on an acousto-optic light deflector, of the type in which diffraction and frequency modulation of light are controlled by travelling acoustic waves. As described in detail hereinafter, such a acousto-optic light deflector can be driven such as to produce a pair of light beams from an incident light beam, which are mutually divergent by a small predetermined angle and differing in frequency from one another by a predetermined degree. This pair of light beams is then split into two pair of light beams travelling in two different directions. One pair of light beams is directed onto a photo-receptor such as to interfere and thereby produce a beat-frequency signal from the photo-receptor which contains a frequency component equal to the frequency difference between the two light beams incident thereon. This component is utilized as a phase reference signal. The other pair of light beams are focussed such as to form extremely minute spots spaced apart by a predetermined small distance upon the surface under measurement. The resultant reflected light beams from the surface under measurement are directed onto a photo-receptor such as to interfere, whereby a signal component is produced by this photo-receptor whose frequency is equal to the frequency difference between these light beams. However, if there is a difference in surface height between the points on the surface under measurement at which the pair of light beams is incident thereon, then this will result in a difference in overall path length of the reflected light beams, which can be represented as a phase shift between the reflected light beams incident on the second photo-receptor. This phase shift results in an identical phase shift in the output signal from that photo-receptor, and the amount of phase shift is measured by comparing the latter output signal with the reference signal using a phase comparator. The measure phase shift information is than processed by data-processing means to produce surface height variation information.

It is a basic advantage of a surface condition mesurement apparatus according to the present invention that due to the use of phase reference signal which is derived from a reference light beam pair, the measurement accuracy is largely independent of changes in various system parameters, such as slight changes in the optical path length, changes in the characteristics of the optical system, etc. As a result, such an apparatus is completely practical for use in measurement of surface conditions to an accuracy of the order of 0.01 $\mu$m or better.

BRIEF DESCRIPTION OF THE DRAWINGS

FIG. 13 is a general block diagram of a fourth embodiment of a surface condition measurement apparatus according to the present invention, suitable for detecting irregularities such as dust particles and scratches on a polished surface;

DESCRIPTION OF THE PREFERRED EMBODIMENTS

Figure 1A:
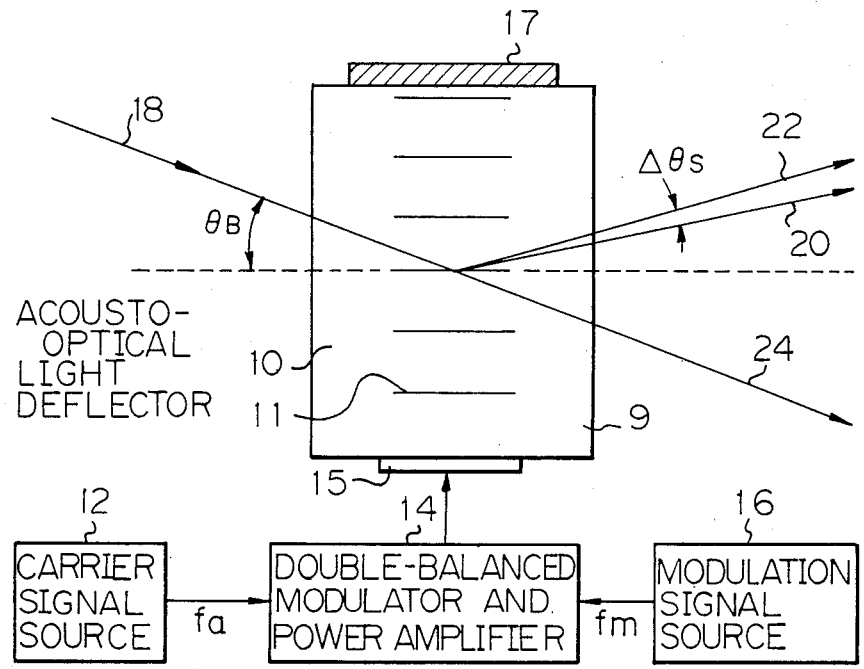
FIG. 1A is a block diagram for illustrating the basic principles of generation of a pair of light beams utilizing an acousto-optic light deflector.
Figure 1B:
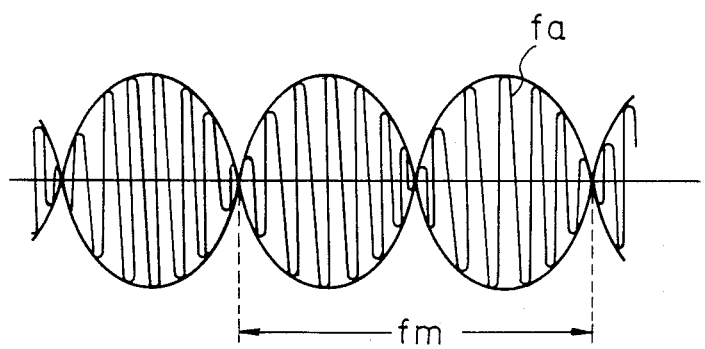
FIG. 1B is a waveform diagram illustrating a drive signal applied to the acousto-optic light deflector of FIG. 1A.

FIG. 1A is a simplified diagram for illustrating the basic principles of an acousto-optic light deflector used in a surface condition measurement apparatus according to the present invention, and the necessary drive circuit arrangement. An acousto-optic light deflector 10 comprises a medium 9 which is transparent to light and suited to propagation of ultrasonic acoustic waves, with a piezoelectric transducer 15 acoustically coupled to the medium. Numeral 17 denotes an acoustic absorption member. Numeral 14 denotes a combination of a double-balanced modulator circuit and a power amplifier circuit for amplifying the modulator output. A carrier signal source 12 inputs a high-frequency carrier signal at frequency $f_a$ to the modulator circuit, while a modulation signal source applies a sinusoidal waveform modulation signal of lower frequency, $f_m$, which is applied as a modulation signal to the modulator circuit. As a result, an output signal is applied to piezo-electric transducer 15 having the waveform illustrated in FIG. 1B, i.e. which comprises the sideband frequency components $(f_a+f_m)$ and $(f_a-f_m)$. Ultrasonic travelling acoustic waves are thereby generated in medium 9, as indicated by numeral 11, which produce successive regions of relatively increased and decreased coefficient of refraction in medium 9. As a result, medium 9 serves to diffract and to frequency modulate light which passes therethrough. Numeral 18 denotes a light beam which is emitted from a source such as a laser and enters medium 9 at an angle $\theta_B$ with respect to the transverse direction of the travelling acoustic waves, and is thereby split into a non-diffracted coponent 24 and two diffracted component light beams 20 and 22. This diffraction phenomenon has been described in detail in, for example, a paper by Baronian presented at the IEEE 1974 Region Six Conference, entitled "Acousto-optic Bragg Diffraction Devices and their Applications", and is basically analagous to the diffraction of X-rays in crystals. The optimum value of the input angle of incidence $\theta_B$, with regard to maximizing the diffracted light component, is therefore referred to as the Bragg angle.

Designating the frequency of the light waves in the incident light beam 18 as $f_0$, frequency modulation of the incident light beam is performed within medium 9, whereby the diffracted component light beams 20 and 22 have the respective frequencies $(f_0+f_a+f_m)$ and $(f_0+f_a-f_m)$.

The angle of divergence between the two diffracted light beams 20 and 22 is determined by the frequency difference between them, and hence can be varied by variation of the modulation frequency $f_m$.

The degree of diffraction produced, and hence the direction at which the pair of light beams 20 and 22 emerge from the acousto-optic light deflector, can be varied by varying the carrier frequency $f_a$. However to produce major changes in this direction, it is necessary to ensure that the direction of incidence of the incoming light beam is held close to the Bragg angle.

A suitable drive circuit, to perform the functions of circuit blocks 12 and 14 in the example of FIG. 1A, is commercially available from IntraAction Corp, under the designation Model DE-70M VCO Deflector Driver, and a suitable acousto-optic light deflector is marketed by the same under the designation Model AOD-70 Acousto-optic Light Deflector.

By comparison with homodyne interference, heterodyne interference of light can be used as the basic of a method for measuring the condition of a surface to a level of accuracy which is greater by two orders of magnitude or more. With the heterodyne interference of light method, a pair of light beams including mutually different frequency components are reflected from the surface under measurement, and the reflected beams are made to interfere while incident on a photo-electric transducer. A beat-frequency signal is thereby produced by the transducer whose frequency is equal to the difference between the frequency components of the two light beams.

For example, if light of frequency $f_1$ is designated as $E_1$, and light of frequency $f_2$ is designated as $E_2$, then these can be expressed as time functions as follows:

$$E_1(t) = A_1(t) \cos(2\pi f_1 t + \phi_1(t))$$

$$E_2(t) = A_2(t) \cos(2\pi f_2 t + \phi_2(t))$$

Here, $A_1$ and $A_2$ are the amplitudes, and $\phi_1$, $\phi_2$ denote the phase.

If these light waves are allowed to interfere, then the amplitude I(t) of the interference is given as:

$$I(t) = |E_1(t) + E_2(t)|^2$$

If this is converted to an electric current i(t) by a photo-sensor, then the following electrical signal can be obtained:

$$i(t) \alpha A_1^2 + A_2^2 + 2A_1 A_2 \cos(2\pi \Delta f t + \Delta \phi)$$

Here, $\Delta f = f_1 - f_2$, $\Delta \phi = \phi_1 - \phi_2$. Electrical sensing of this signal can be carried out if $\Delta f$ is in the range $10^5$ to $10^6$ Hz, approximately. By sensing changes in the frequency and phase of this beat frequency signal, information within the frequency range of the original light can be derived with a high level of accuracy. That is to say, any difference if such a pair of light beams is reflected from a surface, then any difference in surface height between the points on which the beams fall will result in a difference in the overall path length of the beams when they are converted to an electrical signal, i.e. there will be a phase shift between the beams, which will appear as a phase shift of the electrical signal.

Figure 2:
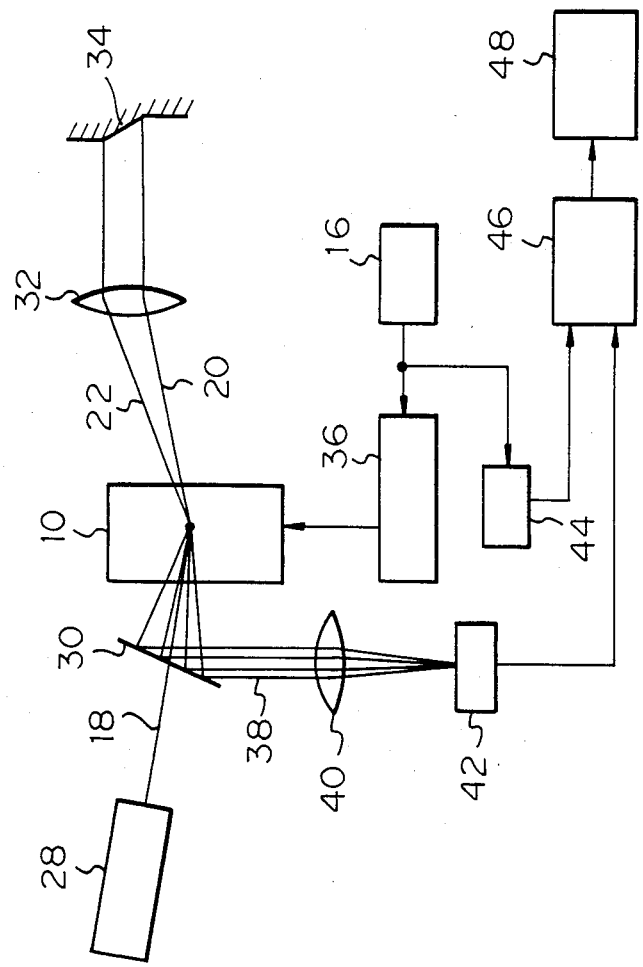
FIG. 2 is a general block diagram of an example of a prior art type of surface condition measurement apparatus utilizing the heterodyne interference of light principle.

A surface measurement apparatus according to the present invention utilizing the heterodyne interference of light employs an acousto-optic deflector to produce the necessary pair of light beams. FIG. 2 is a block diagram of a prior art type of apparatus for measurement of surface height variations, using an acousto-optic deflector. Numeral 28 denotes a laser oscillator section, which can comprise for example a He-Ne laser. Numeral 18 denotes the light beam which is emitted from laser oscillator section 28, this light beam having a frequency $f_0$. Numeral 30 denotes a beam splitter, and 10 denotes an acousto-optical element. Numeral 16 denotes an oscillator circuit which generates a sinusoidal waveform signal output at frequency $f_m$. Numeral 36 denotes the acousto-optic deflector driver, which comprises a double-balanced mixer and power amplifier combination, as shown in FIG. 1. As described hereinabove, the acousto-optic deflector driver 36 generates an output signal containing the sideband frequency components $(f_a+f_m)$ and $(f_a-f_m)$. As a result of application of this signal to acousto-optic deflector 10, the incident light passing through acousto-optic deflector 10 becomes diffracted and modulated, such that two light beams 20 and 22 are output therefrom, having the respective frequencies $(f_0+f_a+f_m)$ and $(f_0+f_a-f_m)$.

These two light beams 20 and 22 are focussed by a lens 32, and then become incident on the surface under measurement 34. Differences in the lengths of the paths travelled by these light beams will be produced due to differences in the surface height of surface under measurement 34, resulting in phase differences being produced between these two light beams, i.e. the light beams are subjected to phase modulation.

The two light beams 20 and 22, phase modulated in this way, are reflected from surface 34 and again return to acousto-optic deflector 10, to be again subjected to diffraction and modulation. As a result, a total of four beams, collectively designated as 38, are produced.

These light beams are deflected by beam splitter 30, and are focussed by lens 40 onto a photo-electric transducer 42, to be converted to an electrical current signal, i.e. beat frequency signal. This beat frequency signal, designated as I, can be expressed as follows:

$$I = I_0[2 + 0.5 \cos\theta + \cos 2\pi \cdot 2fmt + \cos(2\pi \cdot 2fmt + \theta) + 0.5\cos(2\pi \cdot 4fmt + \theta)]$$

Here, $\theta$ denotes the phase difference between the two light beams.

This current signal is filtered, to thereby derive the 4fm frequency component of the signal. Numeral 44 denotes a frequency multiplier for producing a sinusoidal signal whose frequency is a four times that of oscillator 16. The phase comparator 46 produces current-voltage conversion of the 4fm frequency component of the input signal, and derives the phase difference between the reference signal from oscillator circuit 16 whose phase is $\cos(2\pi \cdot 4fmt)$ and the reflected light signal whose phase is $\cos(2\pi \cdot 4fmt + \theta)$, i.e. derives the phase difference $\theta$. The data processing section 48 computes the surface height variations in accordance with this phase information.

With the method described above, the light which is reflected from surface under measurement 34 is returned to acousto-optic deflector 10, in order to generate inteference between four light beams. As a result, the path of the reflected light is long, so that adjustment of the optical axis becomes complex In addition, external disturbances such as vibration, etc, have a magnified effect upon the accuracy of phase comparison of the electrical signal and the light signal. The measurement accuracy will also be strongly affected by any changes in the characteristics of the optical system resulting from temperature veriation, etc, due to the extremely minute variations in surface height which are to be measured. Furthermore, it is necessary to use a bandpass filter with photo-receptor 42, and in addition the electrical circuitry is made complex by the need to perform frequency multiplication by a factor of 4. As a result of these factors, such an apparatus is not practicable for use in a normal industrial envirannment.

Figure 3:
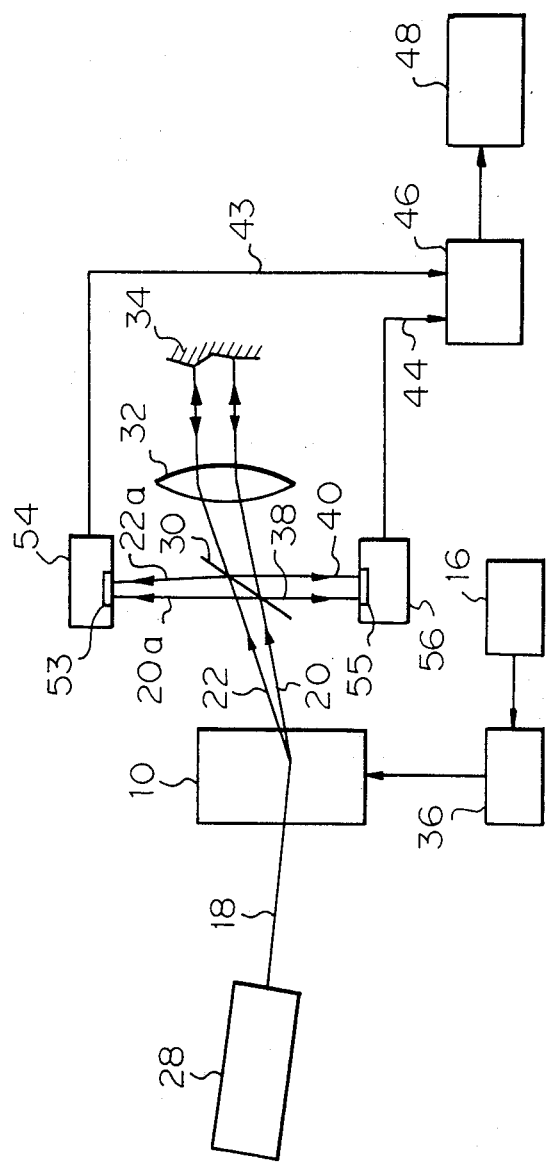
FIG. 3 is a general block diagram of an embodiment of a surface condition measurement apparatus according to the present invention.

FIG. 3 is a block diagram of an embodiment of a surface condition measurement apparatus according to the present invention.

A single light beam 18, at a frequency $f_0$, is emitted from a laser oscillator section 28, which can comprise a He-Ne laser tube or a semiconductor laser, and is incident upon an acousto-optical element 10. Ultrasonic travelling waves are generated within acousto-optical element 10 by an acousto-optical driver 36 in response to an input signal at frequency $f_m$ applied to acousto-optical driver 36 from a sine wave oscillator 16, and as a result of interaction between these ultrasonic waves and the light beam 18, two light beams 20 and 22 having mutually different frequencies are emitted from acousto-optical element 10, i.e. as described hereinabove, light beams 20 and 22 contain the frequency components $(f_0+f_a-f_m)$ and $(f_0+f_a+f_m)$ respectively.

The angle of divergence between light beams 20 and 22 is proportional to the modulation frequency $f_m$, so that if frequency $f_m$ is made variable, the spacing between the beams used to measure the surface condition can be varied.

Numeral 30 denotes an optical isolator, which is made up of a polarizing beam splitter and a ¼ wavelength plate, the latter being disposed on the opposite side of the polarizing splitter to acousto-optic deflector 10. This optical isolator 30 is positioned between acousto-optical element 10 and the surface under measurement 34. The two light beams 20 and 22 are each split by optical isolator 30 into light beams travelling in two different directions. As a result, reference light beams 20a, 22a are produced, which do not impinge upon the surface under measurement 34, while the light which emerges from optical isolator 30 in the other direction passes through a condenser lens 32 to be thereby focussed onto the surface under measurement as two extremely small-diameter spots separated by a fixed spacing. The resultant light beam pair reflected from surface 34 then passes through condenser lens 32 and is reflected by optical isolator 30. This reflected light is designated as light beams 38 and 40 in FIG. 3. Numeral 54 denotes a photo-electric transducer section including a photo-receptor 53, which performs photo-electric conversion of interference between the reference light beams 20a, 22a, while numeral 56 denotes a photo-electric transducer section which includes a photo-receptor 55 to perform photo-electric conversion of the interfering reflected light beams 38, 40. Each of these photoelectric transducer sections can comprise for ecample a PIN photo-diode used as a photo-receptor, and a current-voltage converter, with the beat frequency signal current produced by the PIN photo-diode being converted to a voltage signal.

As described hereinabove, there will be a shift in phase between the reflected light beams 38 and 40, whose magnitude will be determined by the difference in surface height between the points on surface 34 at which the light beams from condensor lens 32 are respectively incident, and with the derection of the phase shift being determined by the direction of that height difference. As a result, corresponding shifts will occur in the phase of the beat frequency signal generated by interference between these light beams, from photoelectric transducer section 56. If the DC component is removed from each of the ouuput signals from photoelectric transducer sections 54 and 56, then the resultant AC voltage signals, indicated as 43 and 44 respectively, can be respectively expressed as follows:

$$A_1' \cos(2\pi \cdot 2fmt + \theta_1)$$

$$A_2' \cos(2\pi \cdot 2fmt + \theta_2)$$

In the above, $\theta_1$ is a fixed quantity, which is the initial phase of the reference signal. $\theta_2$ is a quantity which varies in accordance with the amplitude of the surface irregularities of the surface under measurement 34. The difference $(\theta_2 - \theta_1)$ represents an actual amplitude of the surface irregularities, and the value of this quantity is detected by phase comparator 46.

If the amplitude of the surface irregularities of the surface under measurement 34 illuminated by light beams 20 and 22 is denoted as Z, then this can be expressed as:

$$Z = \lambda \cdot \theta / 4\pi$$

In the above, $\lambda$ is the wavelength of the light output from the laser, and $\theta$ denotes phase. If a He-Ne laser is used, then $\lambda = 0.6328$ μm, so that Z has a value of 8.8 angstroms per degree of phase difference. Electrically speaking, it is perfectly practicable to perform phase sensing to an accuracy of within one degree. Thus, this method enables highly sensitive measurement to be carried out with an accuracy which is 100 times or more greater than has been possible with prior art types of homodyne interference apparatus By scanning the two light beams over the surface under measurement, linear or planar surface measurement can be performed. The difference between the initial phase of the reference signal and the phase of the signal generated from the reflected light is subjected to processing the data processing section 48, which can comprise for example a microprocessor, whereby the profile of the surface height variations, i.e. surface roughness, can be easily derived.

Linear or planar scanning of the surface under measurement can be performed by any of various methods, such as X-Y stage displacement, scanning of the light beams by utilizing an electromagnetically driven mirror, or scanning of the direction of diffraction produced by acousto-optic deflector 10, by sweeping the carrier frequency $f_a$ generated in driver circuit 36.

As described in the above, with a surface condition measurement apparatus according to the present invention, conversion of surface height information from a phase shift of a light beam into a phase shift of an electrical signal is performed using a beat-frequency signal produced by interference between two light beams reflected from the surface under measurement, which is compared in phase with a similar signal generated by interference between a reference pair of light beams produced within the same optical system. As a result of the balanced type of measurement configuration, the accuracy is relatively unaffected by disturbances such as vibration, due to the path of the reflected light being short, while slight variations in the optical system characteristics or external disturbances such as mechanical vibration have only a small effect upon the meaasurement accuracy. In addition, adjustment of the optical system can be easily performed. Furthermore it is not necessary to provide electrical circuits to perform filtering or frequency multiplication, etc. Phase detector 46 can perform phase angle measurement either in the range $-\pi \leq \theta \leq \pi$, or the range $0 \leq \theta \leq 2\pi$. If meaasurement is performed using the range $0 \leq \theta \leq 2\pi$ then if for example $\theta = 3\pi$, this will be erroneously measured as $\theta = \pi$. In general, defining the value of $\theta$ as $\theta = 2n\pi + \theta_0$, where n is an integer, it will only be possible to measure $\theta_0$, if n is undefined.

Using the two light beams 20, 22 forming the probe beam applied to the surface under measurement 34, to measure the surface condition by the method described above, the range of measurement of Z which is possible (with the range of phase measurement being $-\pi \leq \theta \leq \pi$, or $0 \leq \theta \leq 2\pi$) is given as: $-\lambda/4 \leq Z \leq \lambda/4$ This corresponds to the range of $-0.158 \leq Z \leq 0.158$ micrometers, for the case of a He-Ne laser being used, as described above. The measurement does not indicate whether the direction of variation, so that it cannot be determined whether a surface height variation is of convex or concave form.

If the range of phase angles measured by phase comparator 46 is $-\pi \leq \theta \leq \pi$, then for example if there is a change in surface contour of direction corresponding to the value of Z in the range $-\lambda/4 \leq Z \leq 0$ then this is indicated by the measured phase angle difference being in the range $-\pi \leq \theta \leq 0$. Conversely, if there is a change in surface contour in the opposite direction, corresponding to a value of Z in the range $0 \leq Z \leq \lambda/4$, then this is indicated by the measured phase angle being in the range $0 \leq \theta \leq \pi$ For example, if $Z = \lambda/8$, then $\theta = \pi/2$, while if $Z = -\lambda/8$, then $\theta = -\pi/2$. Thus, conversion from $\theta$ to Z can be carried out precisely if the value of Z is sufficiently small However if $Z = 3/8\lambda$, then this would be measured as a phase angle of $-\pi/2$, and would be incorrectly judged to signify a value of $Z = -\lambda/8$. Thus in such a case, the correct information concerning the surface condition cannot be obtained. That is to say, with the method described above whereby phase comparator 46 alone is utilized, it is not possible to measure a surface condition for which $|Z| > \lambda/4$.

Numeral 57 denotes a signal level comparator, which compares the intensities of the reference light beam and the reflected light beam, as indicated by the output signal levels from photo-electric transducer sections 54 and 56 respectively, to thereby measure changes in the intensity of the light reflected from the surface under measurement. The intensity of light of the reference light beam is of course constant, and so can be utilized as an intensity reference level.

The direction in which the probe light beam is reflected from the surface under measurement will vary in accordance with the surface roughness and shape. The intensity of light measured by photo-electric transducer section 56 will vary accordingly. As the degree of surface roughness or amplitude of shape variations increase, the angle at which the probe light beam is reflected will increase accordingly, so that the light intensity measured by signal level sensor 57 will becomes lower. Numeral 48 denotes a data processing section, which computes the condition of the surface under measurement 34 illuminated by the probe light beam, based on data produced from phase comparator 46 and signal level comparator 57.

In general, $Z = \eta \cdot \lambda/4 + h_0$ (where $|h_0| < \lambda/4$ and n is in integer). The value $h_0$ can computed by data processing section 48 from the phase information produced from phase comparator 46, while data processing section 48 can also derive the value of n from the output data produced by signal level comparator 57. Using these values, data processing section 48 can compute the value of Z. It is not necessary for the output from signal level comparator 57 to be of gradually varying analog form, since it is sufficient if this comprises a plurality of discrete data values, representing the values $n = 0, 1, 2, \ldots$ respectively.

Figure 5A:
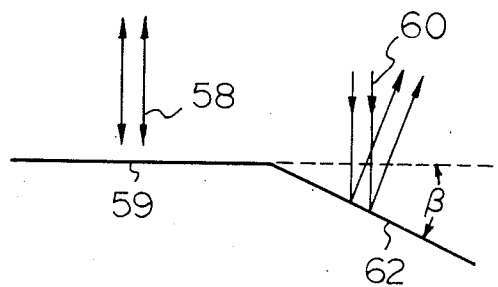
FIG. 5A, 5B and 5C are diagrams for illustrating the operation of the embodiment of FIG. 4.
Figure 5B:
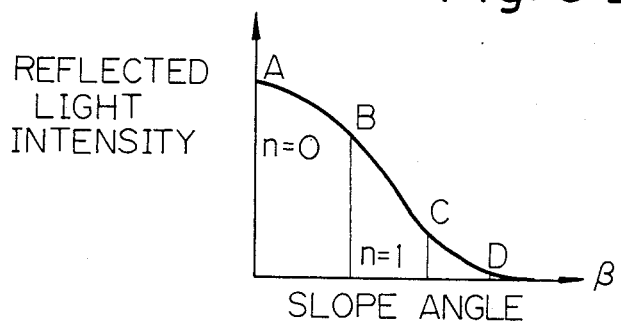
Figure 5C:
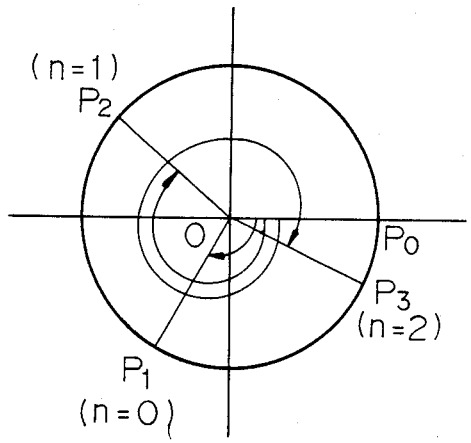

FIG. 5A is a side view illustrating the relationship between incident light and reflected light on the surface under measurement i.e. the two light beams described above. FIG. 5B is a graph which illustrates the relationship between the angle of slope of the surface under measurement and the intensity of the reflected light reaching signal level sensor 57. FIG. 5C is a diagram illustrating the relationship between phase angle and the angle of slope of the surface under measurement.

In FIG. 5A, numeral 58 denotes the two light beams which are incident upon a plane portion 59 of the surface under measurement, with the reflected light returning along the same direction as the incident light. Numeral 60 denotes the two light beams for the case in which they are incident upon an inclined surface portion 62, so that the direction of the reflected light beams makes an angle with the direction of the incident light beams, which increases as the slope angle $\beta$ of the surface increases. The direction of the reflected light correspondingly deviates increasingly from the optical axis of the optical system, so that less light falls upon photoreceptor 55. Thus as shown in FIG. 5B, as the angle of inclination increases, the measured signal level (e.g. the level of the output signal from photo-electric transducer section 56 in FIG. 1) decreases. Furthermore, as the angle of inclination $\beta$ of the surface under measurement increases, the difference between the path lengths of the two beams of light will increase. It can thus be seen that ranges of path length difference, and hence values of n (as defined hereinabove) can be derived as ranges of intensity of the reflected light from the surface under measurement, as represented by an electrical signal level. That is to say, as shown in FIG. 5B, a certain range of reflected light intensity, between points (A–B) on the graph will correspond to the value n=0, another range of light intensity, between points (B–C) will correspond to the value n=1, and the range (C–D) will correspond to the value n=2. Thus, these three values of n can be discriminated by memorizing the two signal level values representing reflected light intensity corresponding to points B and C in the graph of FIG. 5B, in memory means coupled to CPU 48. These signal level values can be derived by experiment.

Thus, as illustrated by the phase angle examples of FIG. 5C, if n=0 then the measured phase angle should be the angle (P0→P1), rotating clockwise as viewed in FIG. 5C, while if n=1 the measured phase angle should be interpreted as (P0→P1→P2), and not (P0→P2). Similarly if n=2, then the measured phase angle should be interpreted as (P0→P1→P2→P0→P3), and not as (P0→P3), rotating clockwise.

Thus, for a measured value of phase angle $\theta_0$, the actual phase angle difference will be $\theta = \theta_0$ if n=0, will be $\theta = 2\pi - \theta_0$ if n=1, and will be $\theta = 2\pi + \theta_0$ if n=2, and so on. In this way, correct data representing the surface condition can be derived for a wider range of surface height variations than is possible with the first embodiment of FIG. 3.

Figure 6:
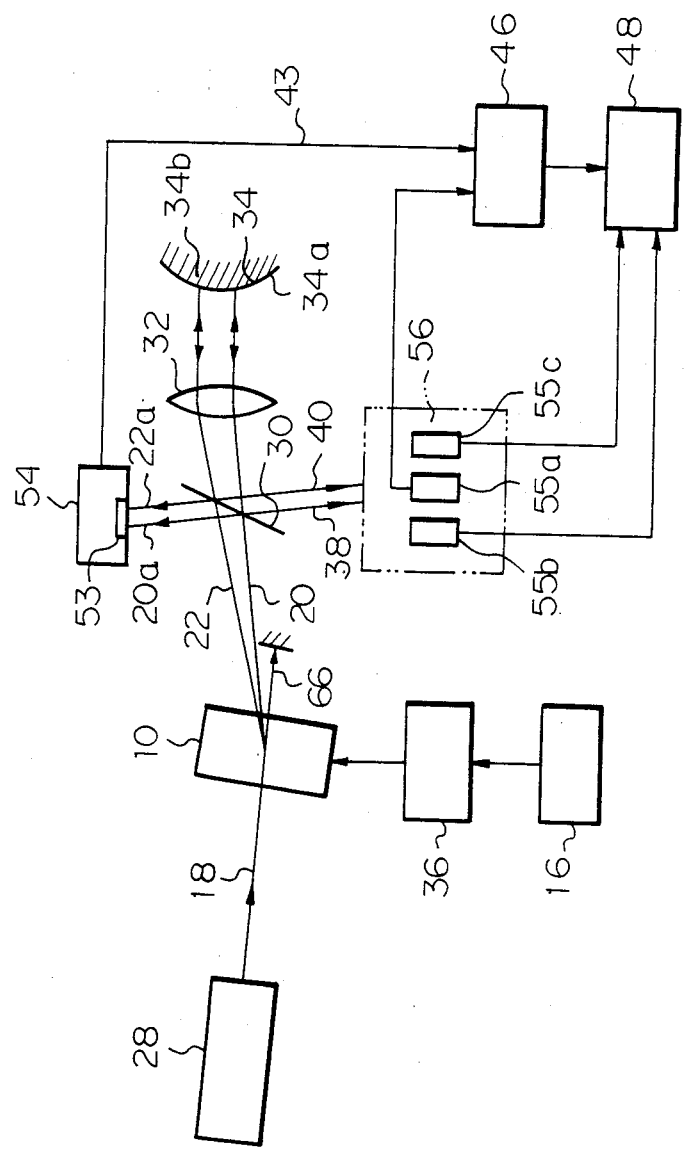
FIG. 6 is a general block diagram of a third embodiment of a surface condition measurement apparatus according to the present invention, whereby the direction of inclination of a portion of a surface under measurement can be sensed.

Referring now to FIG. 6, another embodiment of an acousto-optic deflector according to the present invention is shown. With the embodiments described above, only the absolute value of a surface height variation can be measured, so that for example it is not possible to distinguish between depressions and protrusions on the surface under measurement. In many application, such as measurement of the degree of surface roughness, this will be of no importance. However if such an apparatus is to be used to measure the actual shape of a surface, then it is necessary to derive information indicating the direction of any change in surface height, so that concave and convex forms of height variation can be distinguished, as well as the direction of slope of any inclined portions of the surface. Such discrimination is made possible by the embodiment of FIG. 6.

This embodiment differs from the previous embodiments in the configuration of photo-electric conversion section 56 for the reflected light beams 38 and 40 comprises a primary photo-electric transducer section and the secondary photo-electric transducer sections 55b and 55c. The primary photo-electric transducer section 55a serves to sense the phase of the beat frequency signal which is produced by the light reflected from the surface under measurement, while secondary photo-electric transducer sections 55b and 55c serve to sense the intensity of the light reflected from the surface under measurement, which is determined by the direction in which the light is reflected, to thereby detect changes in the direction in which the probe light beam is reflected as a result of differences in the surface shape, roughness etc of the surface under measurement.

Figure 7A:
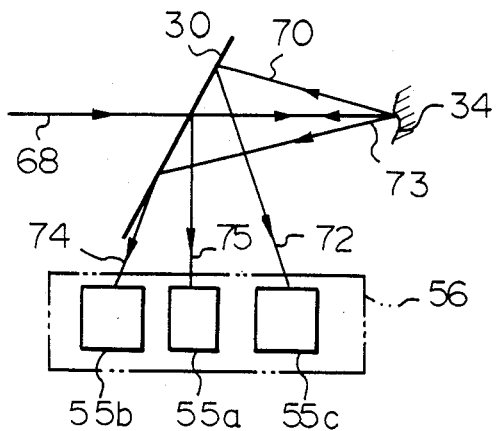
FIG. 7A, 7B and 7C are diagrams for illustrating the operation of the embodiment of FIG. 6.
Figure 7B:
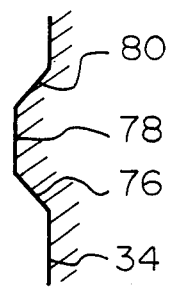

FIG. 7A is a diagram illustrating in more detail the manner in which reflected light falls on transducer sections 55a, 55b and 55c, while FIG. 7B is a diagram for assistance in describing phase angle measurement. For example, if the surface under measurement 34 has the form indicated by numeral 76, then the reflected light will be incident on secondary photo-electric transducer section 55b. If on the other hand surface 34 has the shape indicated by numeral 80, then the reflected light from the surface under measurement will be incident on secondary photo-electric transducer section 55c. Thus, the direction of slope of a portion of the surface on which the light beams are incident can be distinguished in accordance with the particular photo-electric transducer section on which the resultant reflected light impinges. If the surface under measurement 34 is ideally plane and oriented accurately perpendicular to the direction of the incident light beam, then neither of the two photo-electric transducer sections 55b and 55c will receive the light reflected from that surface and the reflected light will only be incident on photo-electric transducer section 55a. If this is true over the entire surface, then it can be adjudged that the surface shape is precisely planar.

Generally speaking, the light reflected from the surface under measurement will have a broad beam width, and it is desirable to arrange the three photo-electric transducer sections with the primary photo-electric transducer section 55a situated centrally, such that the reflected light will be always be incident upon any two of the photo-electric transducer sections.

Normally, the phase difference between the reference light photo-electric transducer section output signal and the output signal from the primary photo-electric transducer section 55a of reflected light photo-electric transducer section 56 will be phase-compared. However, if the angle of reflection of light from the surface under measurement is very large, then the amount of reflected light which is incident on primary photo-electric transducer section 55a of reflected light photo-electric transducer section 56 will become accordingly reduced. In such a case, the phase difference between the reference light photo-electric transducer section output signal and the output signal from one of the secondary photo-electric transducer sections 55b or 55c can be measured. Furthermore, if the surface under measurement 34 has a slope which is oriented in only a single direction, then it may be possible to use only a single secondary photo-electric transducer section, positioned in accordance with the surface inclination.

As described hereinabove, if phase comparator 46 alone is utilized, it is not possible to measure a surface condition for which $|Z| > \lambda/4$.

As described in the above, incident light beam 68 in FIG. 7A actually comprises two light beams, however for simplicity of the diagram this is shown as a single light beam. This is also true for the reflected light. When the incident light beam 68 impinges upon a plane portion 78 of surface under measurement 34, the light is reflected directly back, in the opposite direction to incident light beam 68. This reflected light is changed in direction by optical isolator 30, whereby the light falls upon primary reflected light photo-electric transducer section 55a. The phase change of the reflected light in this case will be zero, i.e. as indicated by 0 in FIG. 7C. If the incident light falls upon a portion 80 of surface under measurement 34, then the reflected light will travel along path 70, and the direction of travel is then changed by optical isolator 30 so that this light proceeds along path 72 to fall on secondary photo-electric transducer section 55c of reflected light photo-electric transducer section 56. The difference in path length of the two reflected light beams is given as:

$$\lambda/4 < Z < \lambda/2$$

Figure 7C:
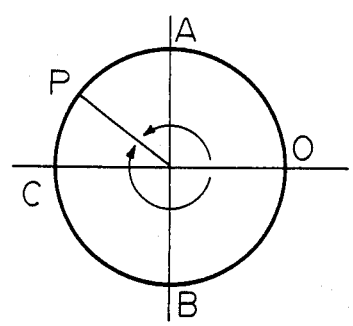

The corresponding change in phase is indicated as angle P in FIG. 7C.

In this case, if phase comparator 46 is operating in the measurement mode $-\pi \leq \theta \leq \pi$, then the phase angle will be measured as (O→A→P) in FIG. 7C, i.e. $\theta = +\theta_0$. However the actual surface condition is such that $\lambda/4 < Z < \lambda/2$, so that actually $\theta < -\pi$. Thus, the phase angle should be measured in the order (O→B→C→P), so that $\theta = -(2\pi - \theta_0)$. Conversion of the phase angle to achieve this correction is performed on the basis of the output signal voltage data from secondary photo-electric transducer section 55c, i.e. in accordance with the intensity of light which is incident thereon.

Since the reflected light from the surface under measurement has a relatively large beam diameter, the light falls simultaneously on photo-electric transducer sections 55a and 55b. The phase is measured by primary photo-electric transducer section 55a, while the direction of reflection is sensed by secondary photo-electric transducer section 55c. Processing is then performed to decide whether or not the measured phase angle $\theta_0$ is to be converted on the basis of the output from secondary phato-electric transducer section 55c.

Similarly, if for example the incident light beam 68 falls upon a portion 76 of surface under measurement 34 then when the direction of the reflected light 73 is changed by optical isolator 30 such that the light travels along path 74, the reflected light will fall upon secondary photo-electric transducer section 55b. Part of the light will also fall upon primary photo-electric transducer section 55a. If the phase angle is assumed to be P, as shown in FIG. 7C, then the system will judge that the surface condition corresponds to $Z < \lambda/4$, and $\theta = \theta_0$.

Thus, whereas using prior art apparatus it has been possible only to perform measurements within the range $|Z| < \lambda/4$, the present invention utilizes sensing of the direction in which light is reflected from the surface under measurement such as to enable measurement of the absolute value of the phase angle within a range $\pi \leq \theta \leq 2\pi$, providing a range of measurement of $|Z| \leq \lambda/2$, so that the surface condition can be measured precisely over a wide range.

Figure 4:
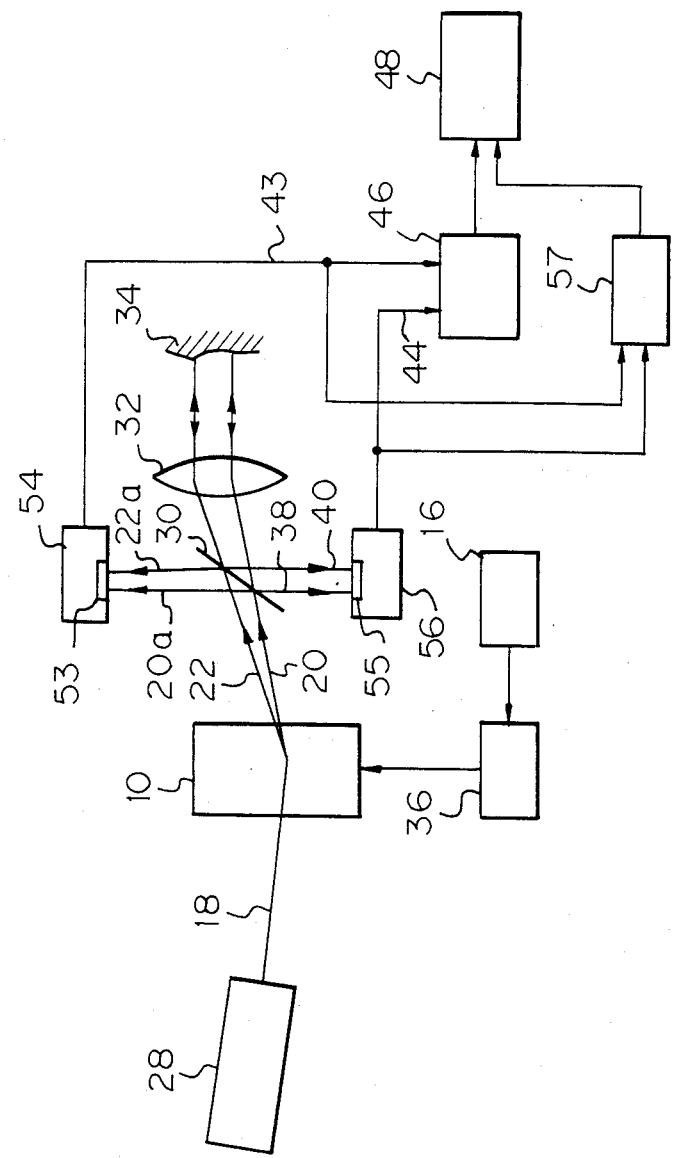
FIG. 4 is a general block diagram of a second embodiment of a surface condition measurement apparatus according to the present invention, whereby an extended range of surface height variations can be measured.

If in addition, changes in the intensity of the reflected light from the surface under measurement are sensed, as in the embodiment of FIG. 4 described above, then it becomes possible to perform measurement of the surface conditions for values of $|Z| > \lambda/2$. In this case, it becomes possible to determine how many multiples of $2\pi$ are contained in the actual phase angle, by measuring changes in the amount of reflected light. For example, if light beams 68 fall on a portion of surface which is inclined as indicated by numeral 76 in FIG. 7B, then as the degree of inclination of this surface portion relative to the plane of portion 78 increases, the amount of light incident on secondary photo-electric transducer section 55b will increase, while the amount of light falling on primary photo-electric transducer section 55a will decrease. The amplitude of the output signals from each of these photo-electric transducer secitons can be sensed, and when the signal level reaches a certain value GO, then this can be interpreted as indicating that the phase angle includes two rotations through $2\pi$.

Thus, this embodiment enables the shape (i.e. convex of concave) of surface height variations to be accurately measured, so that the overall surface shape can be determined by scanning the light beam pair over successive portions of the surface, and performing integration of the phase angles derived as described above.

Figure 8:
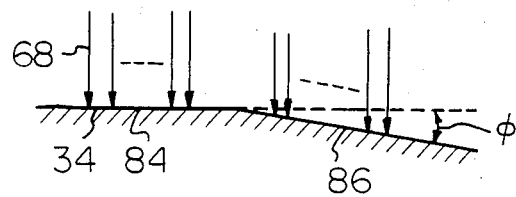
FIG. 8 to FIG. 12 are diagrams for illustrating how a surface condition measurement apparatus according to the present invention can be utilized to measure angles of inclination of a surface under measurement.
Figure 9:
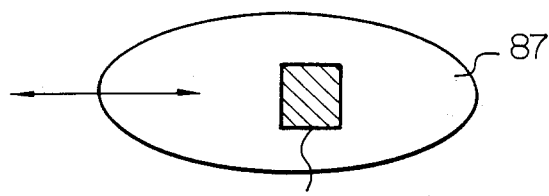
Figure 10:
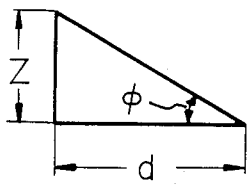

In addition to the use of a surface condition measurement apparatus according to the present invention to measure parameters such as surface roughness or surface shape, such an apparatus can also be used to measure changes in the angle of inclination of portions of a surface with a very high degree of precision. Such measurement can be employed to detect small amounts of distortion of mechanical components, deflection of members, etc. FIG. 8 is a diagram to illustrate such an application of the present invention. Here, a pair of light beams produced by an apparatus according to the present invention as described above, and collectively designated by numeral 68, are successively scanned over a surface 34. It will be apparent that a fixed phase relationship (which can be arbitrarily designated as a phase difference of zero) exists between the resultant reflected light beams while these move over a flat portion 84 of the surface, which is positioned perpendicular to the direction of the incident light beams. The phase difference change which result when the light beams are incident an inclined portion 86 of the surface is represented by the amount by which the phase difference between the reflected light beams differs from the latter "zero" condition. Thus, the absolute values of phase between the reflected light beams is not in itself important, but only the difference in phase between them. It is therefore desirable to have some convenient means for setting the phase difference between the reflected light beams, as measured by phase comparator 46 described above, to a value of zero when the incident pair of light beams 68 fall upon a flat surface portion which is inclined perpendicular to the beam axis. It has been found that if the optical system is arranged such that each of the reference light beams (e.g. 20a and 22a as shown in FIG. 3) is of elliptical shape, i.e. in cross-section as viewed parallel to the beam axis, and these beams are arranged to fall in a mutually overlapping manner upon photo-receptor 53 to form a pattern as illustrated by numeral 87 in FIG. 9, then the phase of the beat-frequency signal generated by photo-receptor 53 can be adjusted by moving the incident beam pattern 87 and photo-receptor 53 laterally with respect to one another, i.e. in the directions indicated by the arrows. In this way, by slightly adjusting the position of photo-receptor 53 while a reference flat, perpendicularly aligned surface is being measured, the output data from phase comparator 46 can be set to indicate a phase difference of zero. In this way, the measured phase difference obtained when an inclined surface portion such as portion 86 in FIG. 8 is measured, will directly represent the slope angle $\phi$.

Use of an elliptical shape of beam as described above has the further advantage that the amount of light falling on the photo-receptor is enhanced, thereby providing an improved signal/noise ratio. It is preferable therefore to also employ such elliptical beam shapes for reflected beams 38 and 40, shown in FIG. 3, which fall upon photo-receptor 55. Adjustment for a phase difference of zero, as described above, can in this case be carried out by adjusting the position of photo-receptor 55 along the major axis of the resultant elliptical incident light pattern thereon, to thereby adjust the phase of the reflected light signal.

In this way the angle of inclination $\phi$ of an inclined surface portion 86 can be obtained from the spacing D between the positions of incidence of the beam pair (which is precisely determined as described hereinabove) and the measured surface height difference Z between these points, i.e. the angle is given as $\phi = \tan^{-1} Z/D$. Processing to compute the value of $\phi$ from the values of D and Z can therefore be performed by CPU 48.

If the level of surface roughness is relatively high, by comparison with the angle to be measured, then it will not be possible to obtain an accurate measurement of the angle from a single reading, and it will be necessary to perform measurements at a number of different positions of the surface and to average the results obtained thereby.

If the value of D is for example 7 μm, then the maximum value of $\phi$ which can be measured is ±1.3°, and measurement to an accuracy of the order of 0.007° is possible. Thus, the present invention enables surface slope angles to be measured to a very high degree of accuracy.

Figure 11:
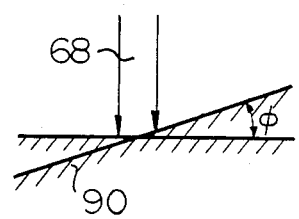
Figure 12:
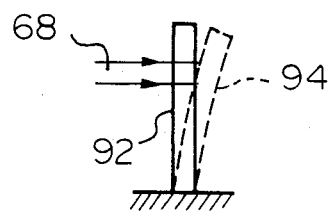

Such angular measurement can be used to measure minute amounts of distortion of components, as illustrated in FIG. 11. Here, a surface is shifted from a normal orientation 88 to an inclined orientation 90 as a result of distortion, and it will be apparent that the amount of distortion can be obtained from the value of angle $\phi$. Similarly as shown in FIG. 12, a member has been deflected from a normal condition 92 to a deflected condition 94. Again, the amount of deflection can be measured from the angle $\phi$, which can be derived as described above.

A surface condition measurement apparatus according to the present invention can also be used to detect the presence of dust particles or slight scratches upon a highly polished mirror surface, such as the surface of a polished semiconductor wafer. An apparatus according to the present invention enables such dust or scratches to be detected even when these are of very minute size, and enables discrimination between dust particles and scraches.

In such measurement, it is generally unnecessary to measure actual sizes of particles or scratches to a very high degree of accuracy, so that the body having the surface to be examined can be mounted on a movable X-Y stage, as indicated by numeral 98 in FIG. 18, to rapidly scan the entire surface.

Figure 14A:
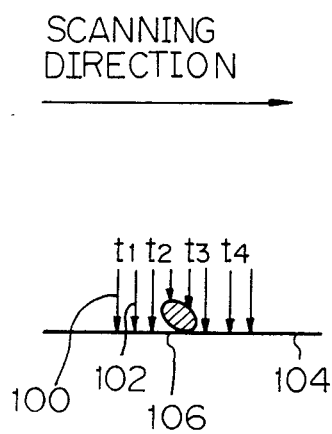
FIG. 14A, 14B, 14C and 14D are diagrams for illustrating the operation of the embodiment of FIG. 12.
Figure 14B:
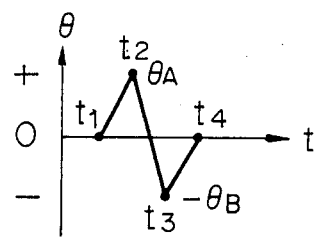

Such detection of dust particles and scratches is illustrated in FIGS. 14A to 14D. In FIG. 14A, a pair of light beams 100 and 102, produced by an apparatus according to the present invention as described hereinabove, i.e. output from condenser lens 32 in FIG. 13, are scanned across a surface 104 which is polished to a mirror finish. At a point in time $t_1$, beam pair 100, 102 are incident upon a clean, flat portion of the surface so that the phase difference between the resultant reflected beams has a value which can be arbitrarily designated as zero, as indicated in the graph of FIG. 14b in which time is plotted along the horizontal axis and phase along the vertical axis. At a subsequent time $t_2$, beams 100 is incident on the polished surface 104, while beam 102 is incident on a dust particle 106. As a result, a positive phase difference $\theta_A$ occurs between the reflected beams, which is sensed by the apparatus as described hereinabove. At a subsequent time point $t_3$, beam 100 is incident on the dust particle, while beam 102 is incident on the polished surface, so that a phase difference $-\theta_B$ is produced between the reflected beams. At a later time $t_4$, both of the beams again fall on the polished surface 104, so that the phase difference returns to zero. In this way, direction of change of phase difference between the reflected beams serves to indicate that a raised defect, i.e. a dust particle, has been detected on the polished surface.

Figure 14C:
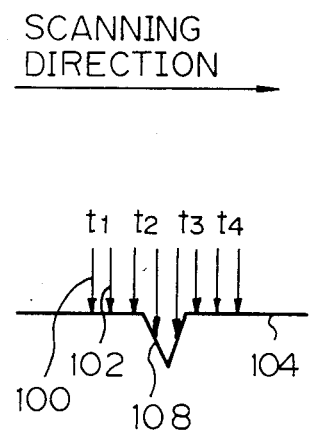
Figure 14D:
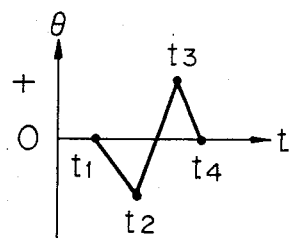

Referring now to FIG. 14C, the detection of a scratch on the polished surface 104 is illustrated. It can be understood that in this case, the phase difference between the reflected light beams will first be negative, i.e. at time point $t_2$ as illustrated in FIG. 14D, then will become positive, at a subsequent time $t_3$, before returning to zero at time $t_4$. Such a direction of change of the phase difference therefore indicates that a scratch or crack defect is present on the surface. In this way, the phase information provided by phase comparator 46 enables CPU 48 to discriminate between dust and scraches on the surface under measurement.

In this way, a surface condition measurement apparatus according to the present invention can be used to sense dust particles or scratches on a polished surface which are extremely small size, e.g. of the order of 0.1 μm, if the pair of light beams 100, 102 are scanned across the surface under measurement in successive 0.1 μm steps.

Figure 15:
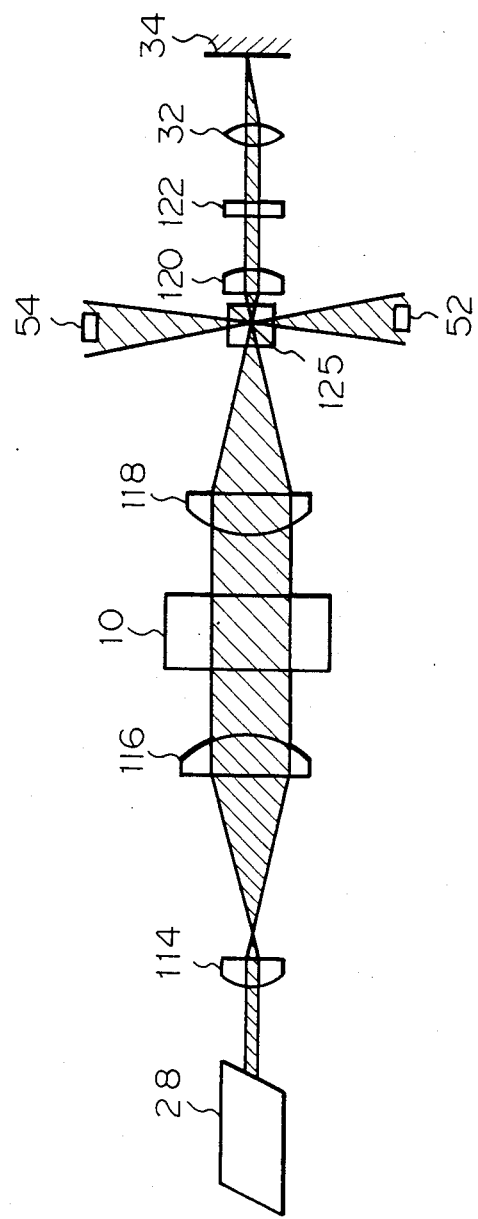
FIG. 15 shows an example of an optical system for a surface condition measurement apparatus according to the present invention.

FIG. 15 illustrates an example of an optical system for the heterodyne interference of light surface measurement apparatus shown in FIG. 3. Numerals 114 and 120 denote cylindrical lenses each of which has a focal length of $L_1$. 116 and 118 are plano-convex lenses, each having a focal length of $L_2$. Numeral 125 denotes a polarizing beam-splitter, and 122 is a ¼ wave plate. Numeral 32 denotes a laser condenser lens having focal length of $L_0$.

Generally speaking, since acousto-optical deflector 10 functions by modulation of the light beams due to interaction between the light beams and the ultrasonic waves in acousto-optical deflector 10, it is desirable that the light beams which are incident on acousto-optical deflector 10 should have a wide beam width. For this purpose, a broad-width beam is produced by the combination of cylindrical lens 114 and plano-convex lens 116. In addition, use of a linearly polarizing laser serves to prevent any dispersion of the reference light beam and the reflected light beam from the surface under measurement being produced by the polarizing beams splitter and the ¼ wave plate 122.

In general, the beat frequency signals 43 and 44 which are output from photo-electric transducer sections 54 and 56 will differ in amplitude. It is desirable to apply input signals to phase comparator 46 which are as constant in amplitude as possible. However the intensity of light reflected back from the surface under measurement will vary in accordance with the reflectance of that surface. To compensate for this, the relative amplitudes of signals 43 and 44 can be adjusted by for example rotating the laser tube in light source 28 about the optical axis, so as to adjust the axis of linear polarization of the output light beam. This will result in a corresponding change in the relative proportions of light which is transmitted through beam splitter 125 to the surface under measurement and the light which is reflected onto photo-receptor 54. Alternatively, the axis of linear polarization can be adjusted by rotating the polarizing plate of beam splitter 30.

As described above, it is preferable to arrange that the light beams which fall upon photo-receptors and 54 are of elliptical cross-section. In addition, the beam entering deflector 10 should also be of elliptical cross-section, for maximum diffraction effectiveness (i.e. with the major axis of the beam shape being parallel to the plane of the paper, viewed in FIG. 15). The latter objective is accomplished by beam-shaping performed by cylindrical lens 114. As a result, the beams emerging from deflector 10 are also of elliptical cross-section, and so therefore will the reference beams falling on photo-receptor 54. The pair of beams which pass through cylindrical lens 120 are converted to have a circular cross-section thereby, so as to minimize the spot size incident on the surface under measurement. However the resultant reflected beams pass back through cylindrical lens 120, and are thereby converted to elliptical cross-section before being reflected onto photo-receptor 52.

In the embodiment of FIG. 15, the two light beams which are split by acousto-optical deflector 10 are indicated as a single beam, for clarity of description. In addition, non-diffracted light is omitted from the drawing.

Designating the modulation frequency which determines the angle of divergence of the two light beams after leaving deflector 10 as $f_m$, then the resultant distance D separating the two light beams when they become incident upon the body surface being measured is given as follows:

$$D = (2L_2 \cdot L_0 \lambda \cdot bm)/(L_1 \cdot V)$$

Here, V is the velocity of travel of sound waves within acousto-optical deflector 10, which is determined by the material forming acousto-optical deflector 10. If for example V=3.8 km/sec, $L_1$=15 mm, $L_2$=500 mm, and $L_0$=7 mm, then if $f_m$=100 kHz, the value of separation distance D will be 7 μm.

The diameter of the beam spots which are incident on the surface under measurement is determined by the diameter of each light beam at entry to condenser lens 32 (where the light beam is changed to a circular Gaussian beam), and the focal length $L_0$ of that lens. In order to produce a small beam diameter when the light beam is incident on the surface under measurement, in order to enable the spacing D between the two beam to be minimized, a beam expander can be inserted between cylindrical lens 120 and condenser lens 32.

Although the present invention has been described in the above with reference to specific embodiments, it should be noted that various changes and modifications to the embodiments may be envisaged, which fall within the invention as set out in the appended claims. The above specification should therefore be interpreted in a descriptive and not in a limiting sense.

What is claimed is:

1. A surface condition measurement apparatus for non-contact detection and measurement of height variations of a surface, comprising:
   a laser light source for generating a polarized light beam;
   acousto-optical light deflector means for converting said light beam from said laser light source into a pair of light beams which mutually differ in frequency by a fixed amount, are mutually divergent by a fixed angle, and are deflected with respect to the direction of said laser light beam by a fixed angle, the values of said frequency difference, angle of divergence and angle of deflection being controlled by said acousto-optical light deflector means;
   optical isolator means disposed such as to split said deflected pair of light beams into a first and a second pair of light beams travelling in mutually different directions;
   first photo-electric transducer means;
   optical means for directing said first light beam pair to be incident on said first photo-electric transducer means, whereby a reference signal is produced by said first photo-electric transducer means, resulting from interference between said incident light beams, having a frequency which is equal to said light beam frequency difference established by said acousto-optical light deflector means;

second photo-electric transducer means;

optical means for focussing said second pair of light beams at two points on said surface under measurement which are spaced apart by a fixed distance, as viewed along the direction of said second pair of light beams, and for directing resultant reflected light from said surface to be incident on said second photo-electric transducer means, whereby a reflected light signal is produced by said second photo-electric transducer means, resulting from interference of said reflected light, having a frequency which is equal to said light beam frequency difference established by said acousto-optical light deflector means;

phase comparator circuit means coupled to receive said reference signal and said reflected light signal, for producing signals representing a phase difference between said reference signal and said reflected light signal;

data processing circuit means coupled to receive said output signals from said phase comparator circuit means, for producing data representing a difference in height between said surface points on which said second light beam pair are incident; and signal level sensing means coupled to receive said reflected light signal from said second photo-electric transducer means, for thereby producing signals indicative of the level of said reflected light signal and thereby indicative of the intensity of said reflected light, said reflected light intensity being reduced in accordance with the angle of inclination of a sloping portion of said surface on which both beams of said second pair of light beams are incident;

in which said data processing circuit means utilizes the surface inclination information thereby conveyed by said signal level sensing means output signals to increase the range of surface height variations which can be measured.

2. A surface condition measurement apparatus according to claim 1, in which a plurality of data values are held stored by said data processing circuit means which correspond to surface slope values as represented by reflected light intensity values, to thereby define a plurality of ranges of surface slope inclination angles as represented by ranges of reflected light intensities.

3. A surface condition measurement apparatus according to claim 1, in which said signal level sensing means comprise signal level comparator means for comparing the level of said reflected light signal with that of said reference signal.

4. A surface condition measurement apparatus for non-contact detection and measurement of height variations of a surface, comprising:

a laser light source for generating a polarized light beam;

acousto-optical light deflector means for converting said light beam from said laser light source into a pair of light beams which mutually differ in frequency by a fixed amount, are mutually divergent by a fixed angle, and are deflected with respect to the direction of said laser light beam by a fixed angle, the values of said frequency difference, angle of divergence and angle of deflection being controlled by said acousto-optical light deflector means;

optical isolator means disposed such as to split said deflected pair of light beams into a first and a second pair of light beams travelling in mutually different directions;

first photo-electric transducer means;

optical means for directing said first light beam pair to be incident on said first photo-electric transducer means, whereby a reference signal is produced by said first photo-electric transducer means, resulting from interference between said incident light beams, having a frequency which is equal to said light beam frequency difference established by said acousto-optical light deflector means;

second photo-electric transducer means;

optical means for focussing said second pair of light beams at two points on said surface under measurement which are spaced apart by a fixed distance, as viewed along the direction of said second pair of light beams, and for directing resultant reflected light from said surface to be incident on said second photo-electric transducer means, whereby a reflected light signal is produced by said second photo-electric transducer means, resulting from interference of said reflected light, having a frequency which is equal to said light beam frequency difference established by said acousto-optical light deflector means;

phase comparator circuit means coupled to receive said reference signal and said reflected light signal, for producing signals representing a phase difference between said reference signal and said reflected light signal;

data processing circuit means coupled to receive said output signals from said phase comparator circuit means, for producing data representing a difference in height between said surface points on which said second light beam pair are incident;

in which said second photo-electric transducer means comprise a primary photo-electric transducer means section and at least one secondary photo-electric transducer means section spaced apart from said primary photo-electric transducer means section by a fixed distance, and in which said data processing circuit means are responsive to a level of output signal produced by said secondary photo-electric transducer means section for determining the direction of said surface height difference, with the magnitude of said surface height difference being measured utilizing the output signal from said primary photo-electric transducer means.

5. A surface condition measurement apparatus for non-contact detection and measurement of height variations of a surface, comprising:

a laser light source for generating a polarized light beam;

acousto-optical light deflector means for converting said light beam from said laser light source into a pair of light beams which mutually differ in frequency by a fixed amount, are mutually divergent by a fixed angle, and are deflected with respect to the direction of said laser light beam by a fixed angle, the values of said frequency difference, angle of divergence and angle of deflection being controlled by said acousto-optical light deflector means;

optical isolator means disposed such as to split said deflected pair of light beams into a first and a second pair of light beams travelling in mutually different directions;

first photo-electric transducer means;

optical means for directing said first light beam pair to be incident on said first photo-electric transducer means, whereby a reference signal is produced by said first photo-electric transducer means, resulting from interference between said incident light beams, having a frequency which is equal to said light beam frequency difference established by said acousto-optical light deflector means;

second photo-electric transducer means;

optical means for focussing said second pair of light beams at two points on said surface under measurement which are spaced apart by a fixed distance, as viewed along the direction of said second pair of light beams, and for directing resultant reflected light from said surface to be incident on said second photo-electric transducer means, whereby a reflected light signal is produced by said second photo-electric transducer means, resulting from interference of said reflected light, having a frequency which is equal to said light beam frequency difference established by said acousto-optical light deflector means;

phase comparator circuit means coupled to receive said reference signal and said reflected light signal, for producing signals representing a phase difference between said reference signal and said reflected light signal;

data processing circuit means coupled to receive said output signals from said phase comparator circuit means, for producing data representing a difference in height between said surface points on which said second light beam pair are incident;

in which said data processing circuit means act to compute an angle of inclination of a sloping portion of said surface on which both beams of said second pair of light beams are incident, from the measured magnitude of said surface height difference and the value of said fixed spacing between the points of incidence of said second pair of light beams.

6. A surface condition measurement apparatus for non-contact detection and measurement of height variations of a surface, comprising:

a laser light source for generating a polarized light beam;

acousto-optical light deflector means for converting said light beam from said laser light source into a pair of light beams which mutually differ in frequency by a fixed amount, are mutually divergent by a fixed angle, and are deflected with respect to the direction of said laser light beam by a fixed angle, the values of said frequency difference, angle of divergence and angle of deflection being controlled by said acousto-optical light deflector means;

optical isolator means disposed such as to split said deflected pair of light beams into a first and a second pair of light beams travelling in mutually different directions;

first photo-electric transducer means;

optical means for directing said first light beam pair to be incident on said first photo-electric transducer means, whereby a reference signal is produced by said first photo-electric transducer means, resulting from interference between said incident light beams, having a frequency which is equal to said light beam frequency difference established by said acousto-optical light deflector means;

second photo-electric transducer means;

optical means for focussing said second pair of light beams at two points on said surface under measurement which are spaced apart by a fixed distance, as viewed along the direction of said second pair of light beams, and for directing resultant reflected light from said surface to be incident on said second photo-electric transducer means, whereby a reflected light signal is produced by said second photo-electric transducer means, resulting from interference of said reflected light, having a frequency which is equal to said light beam frequency difference established by said acousto-optical light deflector means;

phase comparator circuit means coupled to receive said reference signal and said reflected light signal, for producing signals representing a phase difference between said reference signal and said reflected light signal;

data processing circuit means coupled to receive said output signals from said phase comparator circuit means, for producing data representing a difference in height between said surface points on which said second light beam pair are incident, and;

means for scanning said second pair of light beams across said surface;

in which said data processing circuit means is responsive to relative changes in polarity of said phase difference between said reference signal and said reflected light signal with time for detecting and discriminating between foreign particles and scratches upon said surface, as said second pair of light beams is scanned across said surface.

7. A surface condition measurement apparatus for non-contact detection and measurement of height variations of a surface, comprising:

a laser light source for generating a polarized light beam;

acousto-optical light deflector means for converting said light beam from said laser light source into a pair of light beams which mutually differ in frequency by a fixed amount, are mutually divergent by a fixed angle, and are deflected with respect to the direction of said laser light beam by a fixed angle, the values of said frequency difference, angle of divergence and angle of deflection being controlled by said acousto-optical light deflector means;

optical isolator means disposed such as to split said deflected pair of light beams into a first and a second pair of light beams travelling in mutually different directions;

first photo-electric transducer means;

optical means for directing said first light beam pair to be incident on said first photo-electric transducer means, whereby a reference signal is produced by said first photo-electric transducer means, resulting from interference between said incident light beams, having a frequency which is equal to said light beam frequency difference established by said acousto-optical light deflector means;

second photo-electric transducer means;

optical means for focussing said second pair of light beams at two points on said surface under measurement which are spaced apart by a fixed distance, as viewed along the direction of said second pair of light beams, and for directing resultant reflected light from said surface to be incident on said second photo-electric transducer means, whereby a reflected light signal is produced by said second photo-electric transducer means, resulting from interference of said reflected light, having a frequency which is equal to said light beam frequency difference established by said acousto-optical light deflector means;

phase comparator circuit means coupled to receive said reference signal and said reflected light signal, for producing signals representing a phase difference between said reference signal and said reflected light signal;

data processing circuit means coupled to receive said output signals from said phase comparator circuit means, for producing data representing a difference in height between said surface points on which said second light beam pair are incident;

optical means for converting said laser light beam into a light beam of elliptical cross-section before entry to said acousto-optical light deflector means; and optical means for converting each beam of said second pair of light beams to have a circular form of cross-section before incidence on said surface.

8. A surface condition measurement apparatus for non-contact detection and measurement of height variations of a surface, comprising:

a laser light source for generating a polarized light beam;

acousto-optical light deflector means for converting said light beam from said laser light source into a pair of light beams which mutually differ in frequency by a fixed amount, are mutually divergent by a fixed angle, and are deflected with respect to the direction of said laser light beam by a fixed angle, the values of said frequency difference, angle of divergence and angle of deflection being controlled by said acousto-optical light deflector means;

optical isolator means disposed such as to split said deflected pair of light beams into a first and a second pair of light beams travelling in mutually different directions;

first photo-electric transducer means;

optical means for directing said first light beam pair to be incident on said first photo-electric transducer means, whereby a reference signal is produced by said first photo-electric transducer means, resulting from interference between said incident light beams, having a frequency which is equal to said light beam frequency difference established by said acousto-optical light deflector means;

second photo-electric transducer means;

optical means for focussing said second pair of light beams at two points on said surface under measurement which are spaced apart by a fixed distance, as viewed along the direction of said second pair of light beams, and for directing resultant reflected light from said surface to be incident on said second photo-electric transducer means, whereby a reflected light signal is produced by said second photo-electric transducer means, resulting from interference of said reflected light, having a frequency which is equal to said light beam frequency difference established by said acousto-optical light deflector means;

phase comparator circuit means coupled to receive said reference signal and said reflected light signal, for producing signals representing a phase difference between said reference signal and said reflected light signal;

data processing circuit means coupled to receive said output signals from said phase comparator circuit means, for producing data representing a difference in height between said surface points on which said second light beam pair are incident; and optical means for forming each light beam of said first pair of light beams to have an elliptical cross-section before incidence on said first photo-electric transducer means and directing said first pair of light beams to fall on said first photo-electric transducer means in a mutually overlapping relationship to form an elliptical shape of illumination pattern, and for forming said reflected light from said surface to be incident on said second photo-electric transducer means in an elliptical shape of illumination pattern.

9. A surface condition measurement apparatus according to claim 8, and further comprising means for moving said first photo-electric transducer means with respect to said incident first pair of light beams along the derection of elongation of said elliptical illumination pattern, for thereby producing a corresponding adjustment of the phase of said reference signal from said first photo-electric transducer means.

10. A surface condition measurement apparatus according to claim 8, and further comprising means for moving said second photo-electric transducer means with respect to said incident reflected light beams along the direction of elongation of said elliptical illumination pattern, for thereby producing a corresponding adjustment of the phase of said reflected light signal from said second photo-electric transducer means.

11. A surface condition measurement apparatus according to any one of claims 1, 4, 5, 6, 7 or 8, further comprising means for scanning said second pair of light beams across said surface.

12. A surface condition measurement apparatus according to claim 11, in which said scanning means comprise a movable stage for mounting an object having said surface to be measured.

13. A surface condition measurement apparatus according to claim 11, in which said scanning means comprise a movable mirror disposed to reflect said second pair of light beams towards said surface.

14. A surface condition measurement apparatus according to claim 11, in which said scanning means are constituted by said acousto-optical light deflector means, with scanning being accomplished by variation of said angle of deflection produced by said acousto-optical light deflector means.

* * * * *